United States Patent
Dragescu

(10) Patent No.: US 11,240,626 B2
(45) Date of Patent: Feb. 1, 2022

(54) METHOD AND APPARATUS FOR MOVEMENT-RELATED REMOTE DEVICE CONTROL

(71) Applicant: FORD GLOBAL TECHNOLOGIES, LLC, Dearborn, MI (US)

(72) Inventor: James Dragescu, San Diego, CA (US)

(73) Assignee: Ford Global Technologies, LLC, Dearborn, MI (US)

(*) Notice: Subject to any disclaimer, the term of this patent is extended or adjusted under 35 U.S.C. 154(b) by 492 days.

(21) Appl. No.: 15/869,333

(22) Filed: Jan. 12, 2018

(65) Prior Publication Data
US 2019/0222954 A1    Jul. 18, 2019

(51) Int. Cl.
*H04W 4/021*    (2018.01)
*G01C 21/36*    (2006.01)

(52) U.S. Cl.
CPC ........ *H04W 4/021* (2013.01); *G01C 21/3691* (2013.01); *G01C 21/3697* (2013.01)

(58) Field of Classification Search
CPC ....... G01S 5/14; G08C 17/02; G08C 2201/91; H04L 67/18; H04L 67/12; H04M 1/6075; H04M 1/67; H04M 1/72463; H04W 4/027; H04W 4/029; H04W 4/021; H04W 4/023; H04W 4/025; H04W 4/38; H04W 4/40; H04W 84/10; H04W 84/12; B60R 11/0241; B60W 50/00; G07C 5/008; G01C 21/3691; G01C 21/3697
See application file for complete search history.

(56) References Cited

U.S. PATENT DOCUMENTS

| | | | |
|---|---|---|---|
| 8,577,392 B1* | 11/2013 | Pai et al. .............. | H04W 24/00 455/456.3 |
| 8,812,065 B2* | 8/2014 | Miller et al. ........... | H04M 1/00 455/575.9 |
| 9,280,902 B2 | 3/2016 | Silzer, Sr. et al. | |
| 9,369,842 B2 | 6/2016 | Cronin | |
| 9,674,658 B2 | 6/2017 | Partheesh et al. | |
| 2014/0200739 A1* | 7/2014 | Kirsch ................... | G07C 5/008 701/1 |
| 2015/0084750 A1* | 3/2015 | Fitzgibbon ............ | G08C 19/16 340/12.29 |
| 2016/0360368 A1* | 12/2016 | Marti .................... | H04W 4/025 |
| 2018/0299152 A1* | 10/2018 | Libal ..................... | G05B 19/042 |
| 2018/0348718 A1* | 12/2018 | Richardson ........... | H04W 4/029 |

* cited by examiner

*Primary Examiner* — Matthew C Sams
(74) *Attorney, Agent, or Firm* — Michael Spenner; Brooks Kushman P.C.

(57) ABSTRACT

A system includes a processor configured to determine that a boundary parameter associated with an automatic action has been met. The processor is also configured to determine that one or more secondary vehicle-related predefined conditions pre-associated with the action have been met, responsive to determining that the boundary parameter has been met. The processor is additionally configured to instruct the automatic action responsive to the secondary vehicle-related predefined conditions being met.

6 Claims, 3 Drawing Sheets

METHOD AND APPARATUS FOR MOVEMENT-RELATED REMOTE DEVICE CONTROL

TECHNICAL FIELD

The illustrative embodiments generally relate to methods and apparatuses for movement-related remote device control.

BACKGROUND

Devices are becoming increasingly connected, allowing for an advanced degree of execution and planning relating to device functions. Since many devices have both remote communication and control functions, and those devices may also execute functionality desirable in advance of a user's presence (e.g., thermostats), the notion that some form of prediction can be used to precondition an environment or otherwise engage device functions has been posited.

Many of the solutions presented in the space of predictive remote engagement have been tied to "automated" responses, which are distinguishable from pseudo-"smart" responses. That is, a binary trigger may be tied to the occurrence of a singular event and the occurrence/non-occurrence of the event may cause an automated response.

Opportunities exist to improve response and reaction paradigms of systems to move from "automated" type responses to "smart" or pseudo-smart responses.

SUMMARY

In a first illustrative embodiment, a system includes a processor configured to determine that a boundary parameter associated with an automatic action has been met. The processor is also configured to determine that one or more secondary vehicle-related predefined conditions pre-associated with the action have been met, responsive to determining that the boundary parameter has been met. The processor is additionally configured to instruct the automatic action responsive to the secondary vehicle-related predefined conditions being met.

In a second illustrative embodiment, a computer-implemented method includes engaging in a predefined automatic interaction with a consumer device remote from the vehicle, responsive to vehicle-data variables indicating meeting both a bounding parameter, and one or more secondary parameters, considered responsive to meeting the bounding parameter.

In a third illustrative embodiment, a computer-implemented method includes determining when all of a set of vehicle-data conditions are met, responsive to crossing a predefined geographic boundary having a predefined relationship with both a consumer device and a plurality of predefined secondary vehicle-data conditions, also predefinedly associated with the consumer device. The method also includes executing a predefined interaction with the consumer device, responsive to determining that the vehicle-data conditions are met.

DETAILED DESCRIPTION

As required, detailed embodiments are disclosed herein; however, it is to be understood that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
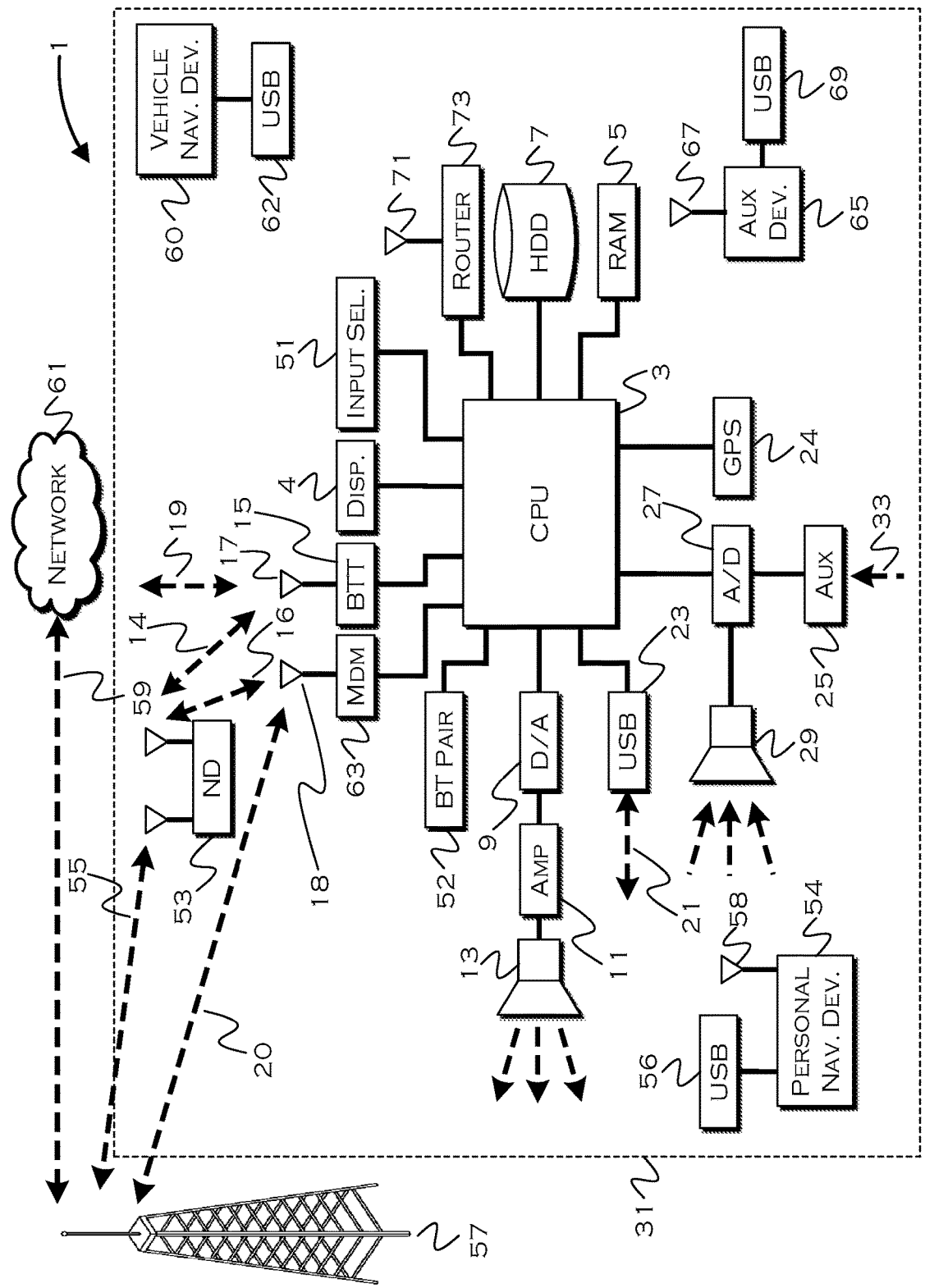
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touchscreen display. In another illustrative embodiment, the interaction occurs through button presses, spoken dialog system with automatic speech recognition, and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be transmitted to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device (hereafter referred to as ND) 53 can then be used to communicate 59 with a network 61 outside the vehicle 31 through, for example, communication 55 with a cellular tower 57. In some embodiments, tower 57 may be a Wi-Fi access point.

Exemplary communication between the ND 53 and the BLUETOOTH transceiver 15 is represented by signal 14.

Pairing the ND 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with ND 53. Alternatively, it may be desirable to include an onboard modem 63 having antenna 18 in order to communicate 16 data between CPU 3 and network 61 over the voice band. The ND 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, the ND 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the interne, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broadband transmission and the system could use a much wider bandwidth (speeding up data transfer). In yet another embodiment, the ND 53 is replaced with a cellular communication device (not shown) that is installed to vehicle 31. In still another embodiment, the ND 53 may be a wireless local area network (LAN) device capable of communication over, for example (and without limitation), an 802.11g network (i.e., Wi-Fi) or a Wi-Max network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

With the onset of the "internet of things," (IoT) many devices now have included remote communication capability, and remote command capability. This allows the devices to both communicate with remote sources and receive commands and data from those sources. This increased level of connectivity has lead to advances in how these IoT devices function. Instead of having to be at a location to command a device to enact a procedure or execute a function, users can now command the devices remotely. This also allows for semi-autonomous control over these devices, in that the commands can be issued from remote sources or triggered by remote occurrences without any direct user interaction.

One possibility that has been proposed includes the idea of using geo-fences to trigger device activation. For example, entering a geo-fence around a home could cause certain home features (lights, doors, heating) to trigger. Iterative geo-fences could cause increasing levels of activity, or the features could be on some form of timer. While this concept may work well for certain functions, such as those triggered by very close proximity, the notion of a geo-fence trigger for heating a cooled house in winter, for example, may require a geo-fence set miles out from a home location. Using the fence as a pure trigger, however, can cause a number of false activations if, for example, the user passes through a fence on the way to a location other than a home. While not excessively problematic, this can cause an unnecessary expenditure of energy, and with more advanced features potentially tied to triggers, the implications of false-positive action could become more problematic. For example, if a user's oven was set to heat food as the user approached, but the user did not arrive home for several hours, the food could be overcooked or even burned. While secondary shutoff measures could accommodate for potential danger-inducing instances such as this, the general point is that these devices can benefit from an improved level of "intelligence."

The vehicle represents a wealth of information relating to a user. Speeds, headings, destinations and other data all can composite to provide a much clearer picture of intended user action than merely "did a user pass a geographic point." The illustrative embodiments provide an advanced control and communication concept that demonstrates how vehicle data can provide a much more intelligent level of decision making than a mere binary decision based on a single trigger.

Figure 2:
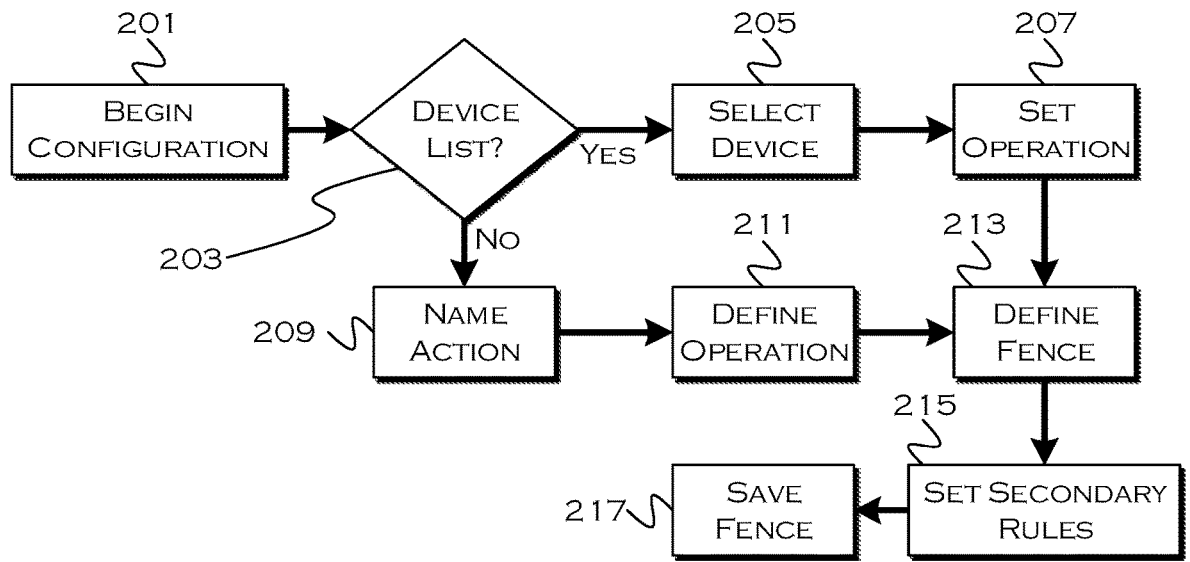
FIG. 2 shows an illustrative process for parameter configuration.

FIG. 2 shows an illustrative process for parameter configuration. In this illustrative example, the process allows a user to configure (via a computer, device, vehicle, phone or other interface) a parameter set designed to trigger an action or inform an action trigger. In this example, the process does use vehicle location related to a fence as a partial trigger, but that is merely a component of the decision-making process, as opposed to a sole basis for it. It is also possible to use indications derivable from other vehicle data which do not include a geo-fence to make similar decisions. Location often does serve as a useful benchmark, however, in the sense that if a user is a significant distance from a certain location, the likelihood of the user desiring automatic device interaction at that location is typically (although not necessarily) diminished.

In this example, the process launches 201 a configuration utility, allowing a user to specify a device, parameters and an action, if so desired. Here, the illustrative process determines 203 if the interface is capable of providing a device list. In some examples, the user may explicitly specify which device is to be controlled by an action, or which device is to be fed data resulting in a certain condition. In other examples, the user may wish to simply pass data to a control program or take other actions (allowing the control program or other entity to decide what to do with the relevant data). The latter case may especially occur in those instances where the user does not have unilateral control over an action (e.g., reserving a location, checking in for a reservation or otherwise performing some form of automatic notice function).

In this example, if there is a list of available controllable devices, the user can select 205 a device to be informed or controlled based on the occurrence of specified parameters. The device may have a control set associated therewith (such as a thermostat) or the device may simply be binary (such as a light or door). If there is a user definable operation, the user can set 207 a desired operational response and then, in this example, define 213 a geo-fence for when an automatic process should consider the relevance of the other parameters. This essentially works as though the user were saying "once I am at this certain location, check to see if these other conditions are met." This both allows the user to define a condition set for the undertaking of an operation, but also to potentially leave the condition set broad enough to encompass a variety of situations, each compartmentalized by geography. It should be apparent that other compartmentalization techniques (e.g. time or other factors) can also work similarly, geography represents the example chosen for purposes of illustration.

If there is not a selectable device list, the user can name 209 or otherwise discretely define an action, and define 211 a generic operation (e.g. send signal, power device, notify entity, etc) associated with the action. For example, a user could have a notification sent to an office administrator whenever the user passed a certain location at a certain time of day, and when the user was headed to an office (determinable by route/vector/heading). The notification could include an expected arrival time. Such a notification could also be passed to a digital sign displayed on a user's office, for example, if intended to notify customers of an expected arrival time. These sorts of notifications could be useful for small business owners who traveled regularly (e.g., a plumber or other service-person), but not in a predictable pattern. So, for example, a plumber could define an action (send arrival time) and a fence (when within 3 miles of a business location) and a set of secondary rules (if headed towards location and between 9 AM and 5 PM). Then, if all parameters were met, the process could tell a potential customer about an imminent arrival.

The secondary rules can be set 215 and they define the more advanced "intelligent" parameters associable with an action-set. Based on observed behavior, user-defined behavior or a combination of both, these parameters can cause automatic systems to behave in a more intelligent-seeming manner. The process can save 219 each fence (or other "bounding" concept) as the user defines the fence. While the preceding may seem needless with only a single or a few fences, a user could intelligently automate a large variety of facets tied to actions predictable based on vehicle movement, and the pseudo-smart nature of these actions could allow for a much more granular degree of control.

Figure 3:
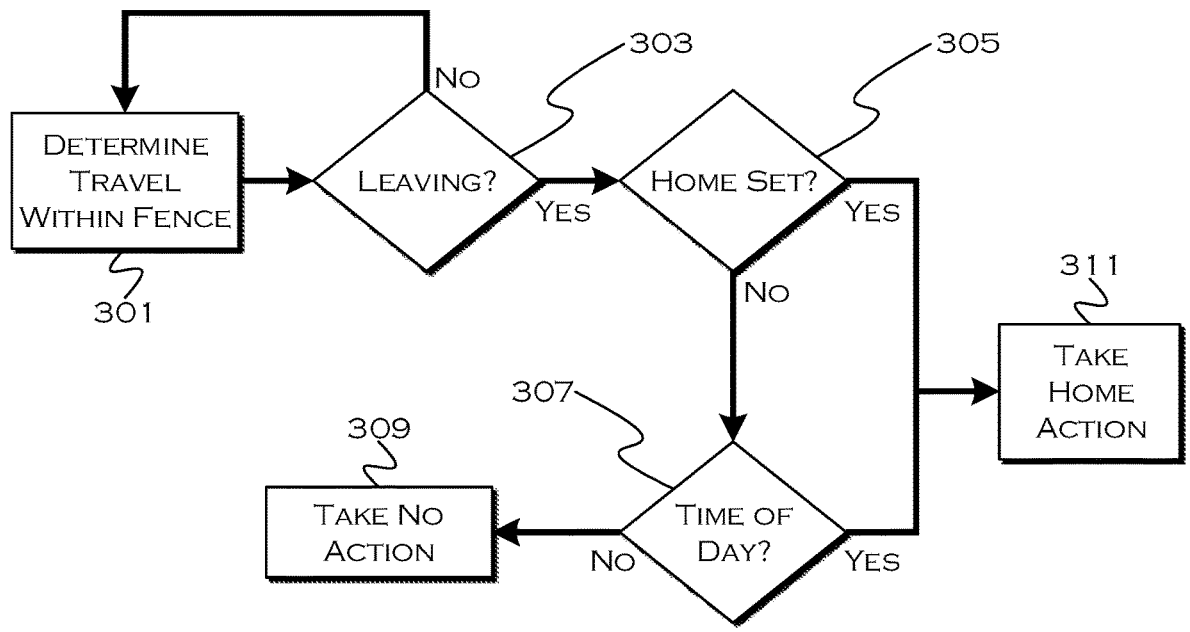
FIG. 3 shows an illustrative trigger process.

FIG. 3 shows an illustrative trigger process. In this example, the illustrative process shows a very limited set of "smart" functions, for example purposes only. A wide variety of vehicle-measurable data could be used in a series of considerations for triggering an action. Here, the process begins by detecting 301 travel within a particular fence.

For the sake of showing alternative fence usages, the fence in question here does not actually surround a device to be controlled, which is at a home location. Instead, this is a fence surrounding a work-location, which may be defined to accommodate typical work-day deviances in travel. This example shows that the fence does not need to surround the device, but can bear a relationship to an aspect of the user life, such that, as in this example, exiting 303 the fence may tend to indicate that the user is often done with that portion of the day (e.g., headed home).

Since the user may periodically exit the fence for other reasons, the process also ties a secondary variable to a decision that the user is actually headed home. A much more complex set of variables could be similarly tied, which could include, for example, considering user heading, vehicle occupancy, weather, other destinations previously visited by the user (e.g., Wednesday evening is "gym day," etc.). Here, the process determines if either home 305 is set as a destination or if a time of day 307 (e.g., 5 pm) would tend to indicate that the user exited the fence for the purpose of heading home. If any of the conditions the user associated with "traveling home" are met, the process instructs 311 an action with regards to the home (e.g., power heating, turn on lights, etc.). Otherwise, the process may pass 309 on taking the action. Certain actions could also simply be delayed until one of the parameters have been met, although those actions may also require that other variables also be met. For example, a user may want lights turned on, but only if the time is during night-time hours. So, if the user is delayed in arriving until morning, for example, the light-activation may be foregone, even if the other conditions (outside/inside fence, headed home as destination) are met. Users can also modify settings associated with a particular action in order to have the action more closely represent the desired action (e.g., in the preceding example, the user may add the "night-time" hours condition (detectable by a vehicle or obtainable from an almanac) after arriving home multiple times in the morning to a lit house during daylight hours).

Figure 4:
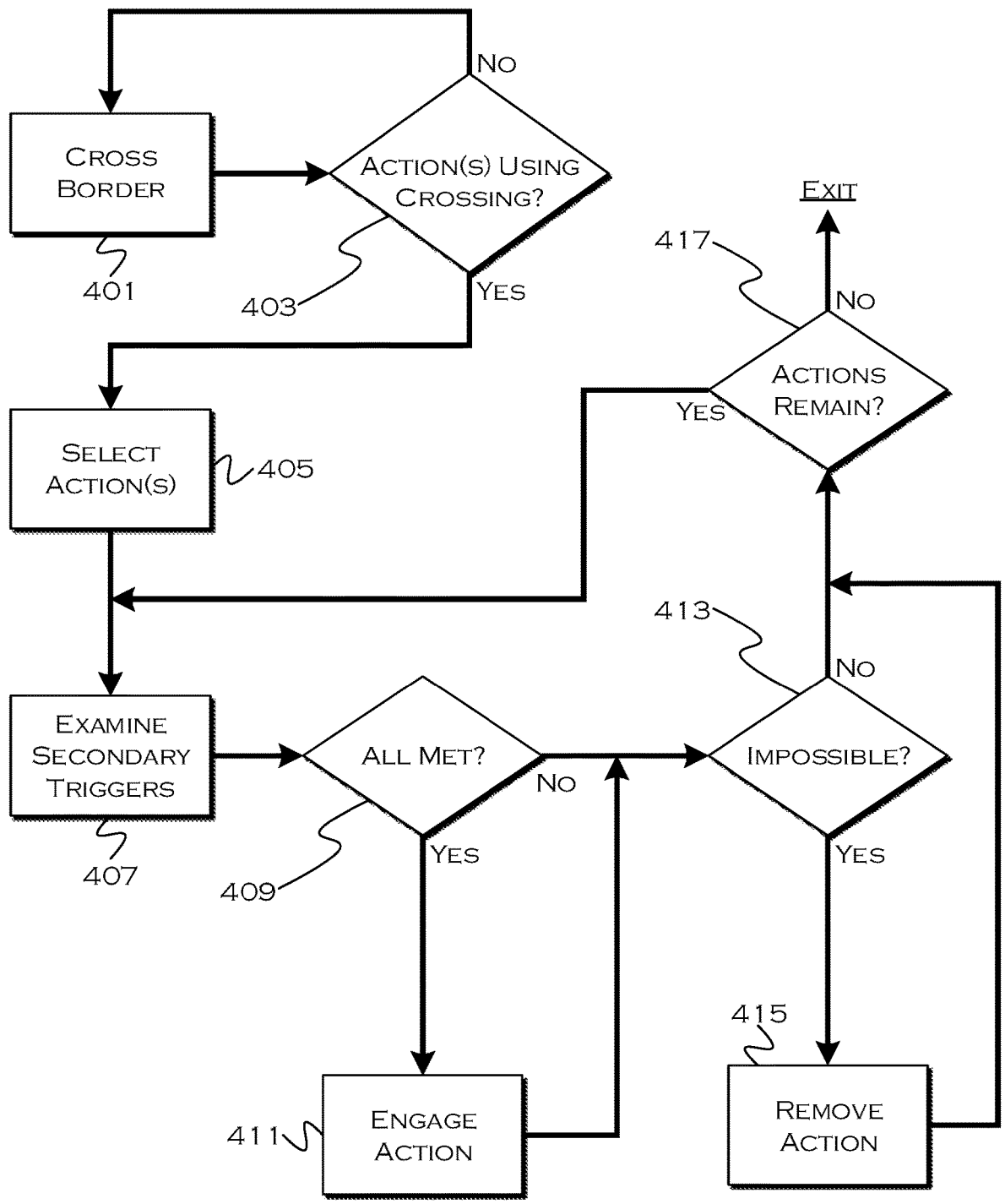
FIG. 4 shows a second illustrative trigger process.

FIG. 4 shows a second illustrative trigger process. This process generally represents the action process undertaken on behalf of a user by a process executing on a remote server in communication with a vehicle, on a device in communication with a vehicle, or on the vehicle itself. Again, geography is used for compartmentalization conceptualization, but other "boundaries," such as time could be similarly enabled.

Here, if the vehicle crosses 401 a defined border, in either direction or in a certain direction, the process determines 403 if an action is associated with the crossing. While not necessary, compartmentalizing by a large-scale parameter (time, geography, temperature, etc) can allow the vehicle to track a limited variable sub-set until if and when a further action need be taken. If a multitude of complex functions are triggered by a variety of data, this can avoid needless data passing and processing until the compartmentalization variable has been met.

In this example, once the initial condition has been met, the process selects 405 one or more actions with the condition as an initial indicator. The triggering condition does not have to be defined as an "initial" indicator, it is perfectly possible to track a wide variety of conditions and narrow further considerations based on any action having one or more current variables associated therewith being met.

In this example, the process selects actions triggered by the crossing, and examines 407 secondary considerations associated with each of those actions. For any action having all conditions defined therewith met 409, the process takes 411 the instructed action. This can include activating a system, transferring data, etc.

If any actions do not have all the conditions met, the process determines 413 if any of the actions have a condition which is "impossible" (at least temporarily). For example, if a condition was "before 4 PM," and the time was 4:30 PM, this condition would be "impossible" at least until a defined start of a next day. Actions having conditions that are unobtainable or impossible are removed 415 from consideration, in this example, although they could also be queued or otherwise delayed until such time as the condition is again obtainable or possible.

If there are still actions remaining 417, that is, if some actions have partially met conditions with possible remaining conditions, the process continues until all possible actions are either performed or impossible. During this time, the user could cross other borders and begin consideration of other actions, this discrete instance shown relates to a series of actions tied to a single border for example only.

It is also possible to tie certain vehicle conditions with the speed of enactment of certain off-vehicle actions. For example, traffic and/or vehicle speed can be used to effectively gauge when to take certain actions, if the user designates those actions as having a desired effect by the time the user arrives at a certain location. This same level of detail could be useful when passing along information (e.g., "user X has left their house in time to arrive for an 8:30 dinner reservation at your restaurant, user is expected to arrive at 8:15").

Through the illustrative embodiments, vehicle drivers can configure complex series of useful and automatic actions to be taken based on behavior predictable based on a the countless parameters available to modern vehicles. This allows for a much improved "smart device" conceptualization. It is also worth noting that many of the parameters could also be gathered by a mobile device and provided to a vehicle, or gathered by a mobile device acting as a proxy for a vehicle in models similar to those described.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A computer-implemented method comprising:
responsive to vehicle-data variables indicating meeting both a boundary that is pre-associated with a consumer device, and a vehicle heading that is predefinedly associated with the boundary parameter, as a variable to be considered upon reaching the boundary parameter, and which is considered responsive to meeting the bounding parameter, the results of which indicate a direction of crossing the boundary, engaging in a predefined automatic interaction with a consumer device remote from the vehicle when the direction of crossing the boundary meets a predefined direction of crossing the boundary pre-associated with the predefined automatic interaction.

2. The method of claim 1, wherein the boundary includes a geographic boundary.

3. The method of claim 1, wherein the automatic interaction includes instructing activation of the consumer device.

4. The method of claim 1, wherein the automatic interaction includes transmitting vehicle information to the consumer device.

5. The method of claim 4, wherein the vehicle information includes arrival time.

6. A system comprising:
a processor configured to:
determine that a boundary parameter pre-associated with a device activation command has been met;
responsive to determining that the boundary parameter has been met while the navigation unit indicates a current heading indicating meeting the boundary parameter while moving towards the destination, determine that a vehicle destination, identified by a navigation unit and pre-associated with the device activation command, has been met; and
instruct the device activation command responsive to the destination being met.

\* \* \* \* \*